US012009761B2

(12) United States Patent
Oh et al.

(10) Patent No.: US 12,009,761 B2
(45) Date of Patent: Jun. 11, 2024

(54) TRIBOELECTRIC GENERATOR

(71) Applicants: LG ELECTRONICS INC., Seoul (KR); GWANGJU INSTITUTE OF SCIENCE AND TECHNOLOGY, Gwangju (KR)

(72) Inventors: Byungsoo Oh, Seoul (KR); Yoseop Shin, Seoul (KR); Sungjun Cho, Seoul (KR); Gunyoung Jung, Seoul (KR)

(73) Assignees: LG ELECTRONICS INC., Seoul (KR); GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 91 days.

(21) Appl. No.: 17/909,564

(22) PCT Filed: Mar. 5, 2020

(86) PCT No.: PCT/KR2020/003118
§ 371 (c)(1),
(2) Date: Sep. 6, 2022

(87) PCT Pub. No.: WO2021/177489
PCT Pub. Date: Sep. 10, 2021

(65) Prior Publication Data
US 2023/0109824 A1 Apr. 13, 2023

(51) Int. Cl.
*H02N 1/04* (2006.01)
(52) U.S. Cl.
CPC ..................................... *H02N 1/04* (2013.01)
(58) Field of Classification Search
CPC . H02N 1/04; H02N 1/08; H02N 2/185; B32B 15/02; B32B 15/085; B32B 15/09; B32B 2327/18; B32B 2383/00

(Continued)

(56) References Cited

U.S. PATENT DOCUMENTS 9,876,443 B2 * 1/2018 Bae .......................... H02N 1/04
11,848,626 B2 * 12/2023 Kim ......................... H02N 1/04
(Continued)

FOREIGN PATENT DOCUMENTS

KR 1020160112587 9/2016
KR 1020180018906 2/2018
(Continued)

OTHER PUBLICATIONS

Minyi Xu, et al., "An aeroelastic flutter based trielectric nanogenerator as a self-powered active wind speed sensor in harsh environment", Extreme Mechanics Letters, Sep. 2017, vol. 15, pp. 122-129, <https://doi.org/10.1016/j.eml.2017.07.005>, reference pp. 123-124, 8 pages (Year: 2017).*

(Continued)

*Primary Examiner* — Ahmed Elnakib
(74) *Attorney, Agent, or Firm* — LEE, HONG, DEGERMAN, KANG & WAIMEY

(57) ABSTRACT

A triboelectric generator is disclosed. The triboelectric generator according to an embodiment of the present disclosure includes a flexible electrode part comprising a first and a second dielectric layer, and at least one metal layer; and a fixed electrode part spaced apart from both sides of the flexible electrode part, and comprising a first and a second electrode connected to each other, wherein the flexible electrode part generates triboelectrification based on contact and non-contact by a fluid flow, and an electric charge moves through the metal layer, thereby effectively moving electric charges generated by triboelectrification, and increasing the friction frequency to enhance power generation efficiency.

16 Claims, 14 Drawing Sheets

(58) Field of Classification Search
USPC .................................................. 310/309, 310
See application file for complete search history.

(56) References Cited

U.S. PATENT DOCUMENTS

| | | | | |
|---|---|---|---|---|
| 2016/0156282 | A1* | 6/2016 | Kim | A61N 1/0484 |
| | | | | 607/61 |
| 2016/0344308 | A1* | 11/2016 | Wang | H02N 1/04 |
| 2017/0317609 | A1* | 11/2017 | Kim | H02N 1/04 |
| 2020/0016878 | A1* | 1/2020 | Ma | B32B 9/007 |
| 2022/0216809 | A1* | 7/2022 | Yu | G06F 3/014 |
| 2022/0255466 | A1* | 8/2022 | Mackenzie | H02N 1/08 |
| 2023/0109824 | A1* | 4/2023 | Oh | H02N 1/04 |
| | | | | 310/310 |

FOREIGN PATENT DOCUMENTS

| | | |
|---|---|---|
| WO | 2015011508 | 1/2015 |
| WO | WO 2021095947 * | 5/2021 |

OTHER PUBLICATIONS

PCT International Application No. PCT/KR2020/003118, Search Report dated Dec. 4, 2020, 4 pages.

Minyi Xu, et al., "An aeroelastic flutter based trielectric nanogenerator as a self-powered active wind speed sensor in harsh environment", Extreme Mechanics Letters, Sep. 2017, vol. 15, pp. 122-129, <https://doi.org/10.1016/j.eml.2017.07.005>, reference pp. 123-124, 8 pages.

Syed Abu Nahian, et al., "A study of sustainable green current generated by the fluid-based triboelectric nanogenerator (FluTENG) with a comparison of contact and sliding mode", Nano Energy, Aug. 2017, vol. 38, pp. 447-456, <https://doi.org/10.1016/j.nanoen.2017.06.012, reference pp. 448, 10 pages.

* cited by examiner (a)                 (b)

|   | Power density (mW/cm$^2$) |
|---|---|
| A | 0.02 |
| B | 0.22 |
| C | 1.06 |
| D | 3.11 |

TRIBOELECTRIC GENERATOR

CROSS-REFERENCE TO RELATED APPLICATIONS

This application is the National Stage filing under 35 U.S.C. 371 of International Application No. PCT/KR2020/003118, filed on Mar. 5, 2020, the contents of which are all incorporated by reference herein in their entirety.

BACKGROUND

1. Field of the Disclosure

The present disclosure relates to a triboelectric generator, and more particularly, to a triboelectric generator capable of increasing triboelectric properties relative to volume by inserting a metal layer into between friction materials flowing by a fluid.

2. Description of the Related Art

Recently, there is a demand for the development of alternative energy instead of fossil energy such as coal and petroleum. Energy harvesting technology, which has been in the spotlight among alternative energy technologies, is a technology that converts an energy wasted in a surrounding environment into an electric energy, such as harvesting light energy, harvesting energy based on electromagnetic field change, or harvesting energy based on triboelectricity.

Among these energy harvesting technologies, the technology for harvesting triboelectricity is a recently invented power generation method, and is a technology for harvesting energy by using charge transfer that occurs when two materials having different triboelectric properties come into contact. Specifically, a voltage drop at a contact surface occurs in the process where two materials are in contact or non-contact by a mechanical force, which causes electrons to move from one material to the other material, thereby generating electrical energy.

Existing wind-based triboelectric devices mainly use a method in which friction occurs in one direction, and a thickness of friction material located between two electrodes is thick. Accordingly, there is a problem in that electrostatic induction is small, and a performance relative to volume of a device is low.

SUMMARY

In order to solve the above problems, an object of the present disclosure is to provide a triboelectric generator that can increase the amount of moving charges generated by triboelectrification, and reduce the thickness of the friction material, by inserting a metal layer together with a friction material into a flexible electrode part flowing by a fluid.

Meanwhile, in order to solve the above problems, an object of the present disclosure is to provide a triboelectric generator having a high produced power density by increasing a friction frequency, by forming a fixed electrode part in contact with a flexible electrode part in both sides of the flexible electrode part.

The problems of the present disclosure are not limited to the problems mentioned above, and other problems not mentioned will be clearly understood by those of ordinary skill in the art to which the present disclosure belongs from the following description.

According to an embodiment of the present disclosure for achieving the above object, there is provided a triboelectric generator including: a flexible electrode part comprising a first dielectric layer, a second dielectric layer, and at least one metal layer disposed between the first dielectric layer and the second dielectric layer; and a fixed electrode part which is spaced apart from both sides of the flexible electrode part, and includes a first electrode and a second electrode connected to each other, wherein the flexible electrode part generates triboelectrification based on contact and non-contact with at least one of the first electrode or the second electrode by a fluid flow, and an electric charge generated by the triboelectrification moves through the metal layer.

Meanwhile, in the triboelectric power generation device according to an embodiment of the present disclosure for achieving the above object, the first electrode and the second electrode are formed as one body, and a cross-section of the fixed electrode part includes a rectangular shape having an open one side.

Meanwhile, in the triboelectric power generation device according to an embodiment of the present disclosure for achieving the above object, the first electrode and the second electrode are formed as one body, wherein a cross-section of the fixed electrode part includes a rectangular shape.

Meanwhile, the triboelectric power generation device according to an embodiment of the present disclosure for achieving the above object further includes a housing for supporting the flexible electrode part and the fixed electrode part, wherein the housing includes an inlet into which the fluid flows and an outlet through which the fluid is discharged, and a flow path of the fluid is formed from the inlet to the outlet.

Meanwhile, in the triboelectric power generation device according to an embodiment of the present disclosure for achieving the above object, the flexible electrode part includes a shape curved in an inner side of the housing for one end being connected to a lower end surface of the inlet side of the housing, and for the other end being located between the first electrode and the second electrode.

Meanwhile, in the triboelectric power generation device according to an embodiment of the present disclosure for achieving the above object, the inlet includes a portion blocked by the flexible electrode part of the curved shape.

Meanwhile, in the triboelectric power generation device according to an embodiment of the present disclosure for achieving the above object, the first dielectric layer includes one side which is in a contact or non-contact state with the first electrode based on a elasticity of the flexible electrode part, wherein, in response to fluid flowing into the inlet, the flexible electrode part flows based on the flow of fluid, and generates triboelectrification based on contacting and non-contacting with at least one of the first electrode or the second electrode.

Meanwhile, in the triboelectric power generation device according to an embodiment of the present disclosure for achieving the above object, the housing further includes a third electrode formed in the lower end surface, and wherein the metal layer is connected to the third electrode.

Meanwhile, in the triboelectric power generation device according to an embodiment of the present disclosure for achieving the above object, at least one of the first dielectric layer or the second dielectric layer includes a friction pattern formed on a surface which is in contact with the first electrode or the second electrode.

Meanwhile, in the triboelectric power generation device according to an embodiment of the present disclosure for achieving the above object, the first dielectric layer and the second dielectric layer are made of a material having a different electronegativity from the first electrode and the second electrode.

Meanwhile, in the triboelectric power generation device according to an embodiment of the present disclosure for achieving the above object, the metal layer includes a thin film shape.

Meanwhile, in the triboelectric power generation device according to an embodiment of the present disclosure for achieving the above object, the metal layer includes a shape in which a plurality of wires are connected in a form of mesh.

Meanwhile, the triboelectric power generation device according to an embodiment of the present disclosure for achieving the above object further includes an energy storage part electrically connected to the metal layer and the first electrode or the second electrode, wherein the energy storage part stores an electrical energy of a current which is generated by the triboelectrification and flows between the flexible electrode part and the fixed electrode part.

Meanwhile, in the triboelectric power generation device according to an embodiment of the present disclosure for achieving the above object, the metal layer includes at least one of aluminum Al, copper Cu, graphene, Carbon Nano-Tube CNT, or a conductive composite.

Meanwhile, in the triboelectric power generation device according to an embodiment of the present disclosure for achieving the above object, the first electrode and the second electrode comprise at least one of aluminum Al, copper Cu, graphene, Carbon NanoTube CNT, or a conductive composite.

Meanwhile, in the triboelectric power generation device according to an embodiment of the present disclosure for achieving the above object, the first dielectric layer or the second dielectric layer is formed of a material containing at least one of polytetrafluoroethylene PTFE, polydimethylsiloxane PDMS, fluorinated ethylene propylene FEP, polyethylene terephthalate PET, Ecoflex or Silicone rubber.

The details of other embodiments are included in the detailed description and drawings.

EFFECT OF THE DISCLOSURE

According to the present disclosure, there are the following effects.

The triboelectric generator according to an embodiment of the present disclosure inserts a metal layer together with a friction material into a flexible electrode part flowing by a fluid, thereby having the effect of increasing the amount of moving charges generated by triboelectrification, and increasing the reaction efficiency and speed between moving charges and the metal layer Meanwhile, the triboelectric generator according to an embodiment of the present disclosure has the effect of increasing the density of the produced power by increasing the frequency of friction, by forming a fixed electrode part in contact with a flexible electrode part in both sides of the flexible electrode part.

The effects of the present disclosure are not limited to the effects mentioned above, and other effects not mentioned can be clearly understood by those skilled in the art from the description of the claims.

BRIEF DESCRIPTION OF THE DRAWINGS

FIGS. 11A to 11C are a graph and a table showing voltage, current, and power density of a triboelectric generator according to various embodiments of the present disclosure compared to other devices.

DETAILED DESCRIPTION OF THE PREFERRED EMBODIMENTS

Description will now be given in detail according to exemplary embodiments disclosed herein, with reference to the accompanying drawings.

For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. Accordingly, the terms "module" and "unit" may be used interchangeably.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Figure 1:
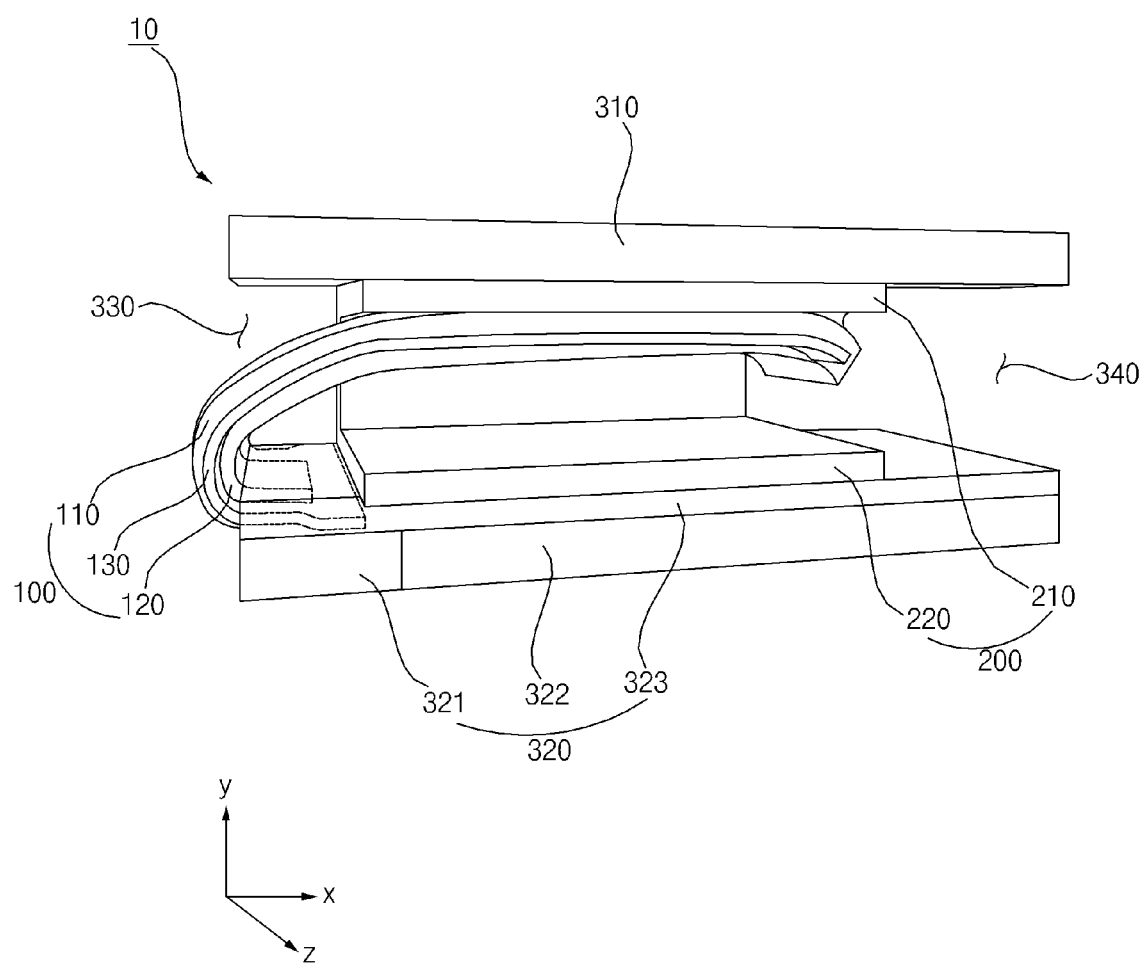
FIG. 1 is a diagram illustrating a triboelectric generator according to an embodiment of the present disclosure.

FIG. 1 is a diagram illustrating a triboelectric generator 10 according to an embodiment of the present disclosure.

Referring to FIG. 1, the triboelectric generator 10 may include a flexible electrode part 100 and a fixed electrode part 200. Meanwhile, the triboelectric generator 10 may further include a housing 300.

The flexible electrode part 100 may include a first dielectric layer 110, a second dielectric layer 120, and a metal layer 130.

The first dielectric layer 110 and the second dielectric layer 120 may be formed of a flexible material so as to be easily moved by the flow of a fluid such as wind.

The metal layer 130 may be inserted into between the first dielectric layer 110 and the second dielectric layer 120.

Meanwhile, the first dielectric layer 110 and the second dielectric layer 120 may include a structure of being connected to each other.

In this case, the first dielectric layer 110 and the second dielectric layer 120 may be connected to each other in a form that surrounds the metal layer 130 inserted therein from the outside.

Alternatively, the first dielectric layer 110 and the second dielectric layer 120 may include a structure of being separated by the metal layer 130 and not connected to each other.

The fixed electrode part 200 may include a first electrode 210 and a second electrode 220. The first electrode 210 may be spaced apart from the flexible electrode part 100 and located in the upper end of the flexible electrode part 100, and the second electrode 220 may be spaced apart from the flexible electrode part 100 and located in the lower end of the flexible electrode part 100.

The first electrode 210 and the second electrode 220 may be electrically connected to each other. The first electrode 210 and the second electrode 220 are located to face each other, and a flow path through which a fluid flows is formed therebetween.

The flexible electrode part 100 may generate triboelectrification based on contact or non-contact with at least one of the first electrode 210 or the second electrode 220 based on a fluid flow flowing between the triboelectric devices. Charges generated by triboelectrification may move through the metal layer 130.

Meanwhile, the flexible electrode part 100 and the fixed electrode part 200 may be included in the housing 300, and supported by the housing 300.

The housing 300 includes an inlet 330 into which a fluid flows and an outlet 340 through which the fluid is discharged, and a fluid flow path from the inlet 330 to the outlet 340 may be formed inside the housing 300.

For example, the housing 300 may include a rectangular parallelepiped shape which has both sides that face each other and are perforated. One perforated side may be the inlet 330, and the other side may be the outlet 340.

A first electrode 210 may be located in a lower portion of an upper end surface 310 of the housing 300, and the second electrode 220 may be located in an upper portion of a lower end surface 320 of the housing.

Figure 2A:
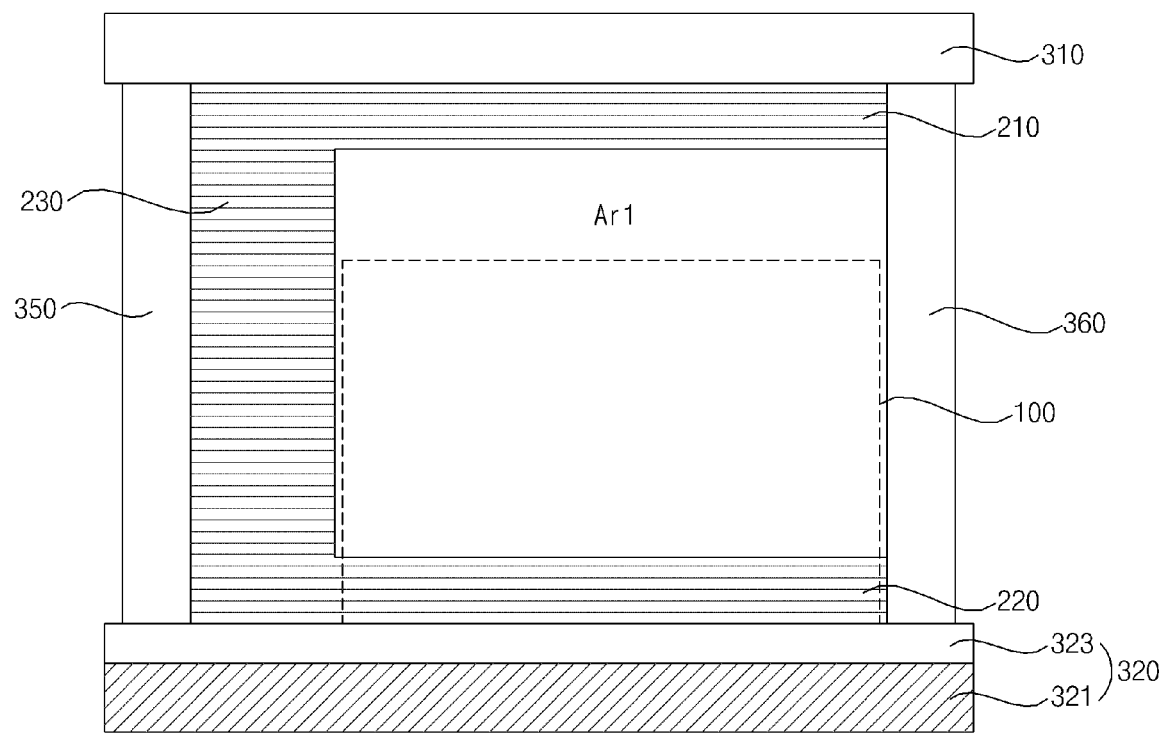
FIGS. 2A to 2B are diagrams illustrating various examples of a cross-sectional structure of a fixed electrode part of the triboelectric generator of FIG. 1.
Figure 2B:
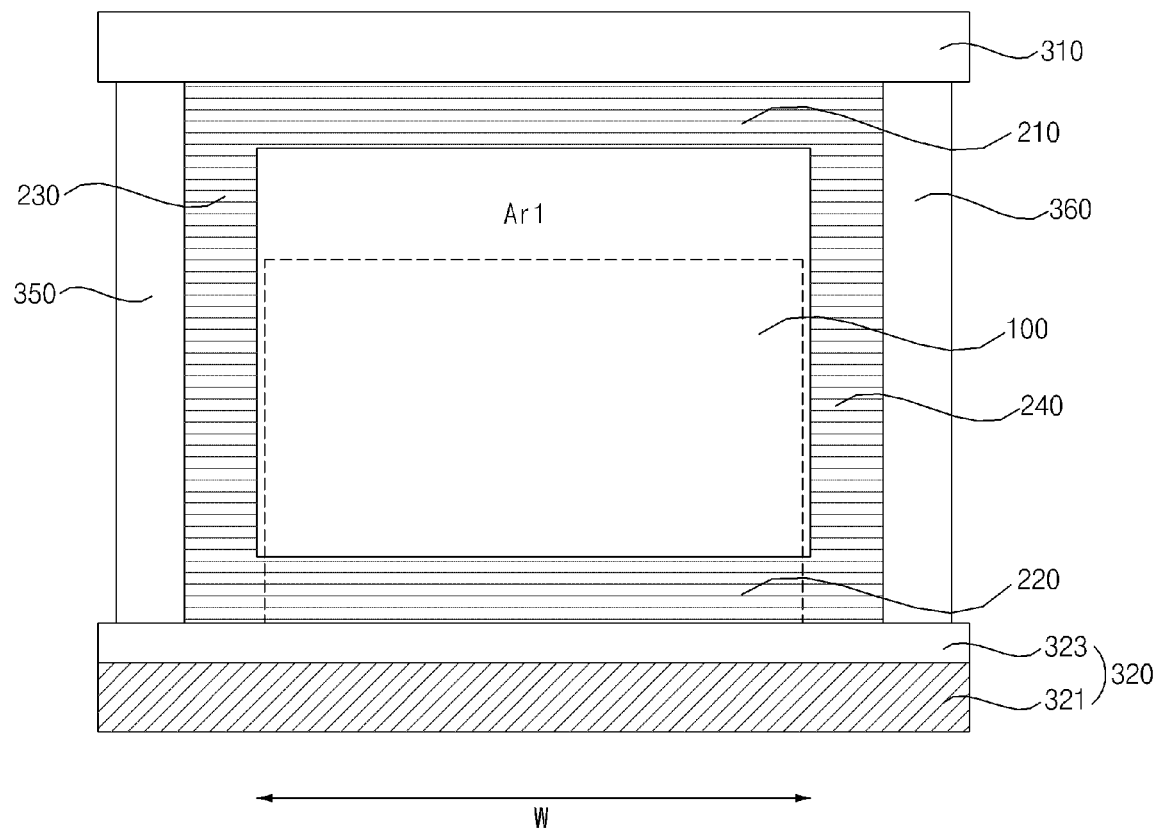

FIGS. 2A to 2B are diagrams illustrating various examples of a cross-sectional structure of the fixed electrode part 200 of the triboelectric generator 10 of FIG. 1. FIGS. 2A to 2B are diagrams illustrating a cross-section of the triboelectric generator 10 as viewed in a direction parallel to an x-axis.

The first electrode 210 and the second electrode 220 of the fixed electrode part 200 may be formed as one body. In this case, the first electrode 210 and the second electrode 220 may be made of the same material, or may be made of a conductive material.

For example, the first electrode 210 and the second electrode 220 may include at least one of aluminum Al, copper Cu, graphene, Carbon NanoTube CNT, or a conductive composite.

Referring to FIG. 2A, the first electrode 210 and the second electrode 220 may be formed together with a first connection part 230 as one body. The first connection part 230 may be located inside the housing, and extends in a y-axis direction between the first electrode 210 and the second electrode 220.

In this case, the cross-section perpendicular to the x-axis of the fixed electrode part 200 includes a rectangular shape having an opened one side. That is, the cross-section includes a U shape. The flow path through which the fluid flows may be formed in the x-axis direction from the inlet 330 to the outlet 340 inside the fixed electrode part 200 having a rectangular shape having an opened one side.

Referring to FIG. 2B, the first electrode 210 and the second electrode 220 may be formed together with a first connection part 230 and a second connection part 240 as one body. The first connection part 230 and the second connection part are respectively located in the left and right sides of the inside of the housing, and extended in the y-axis direction between the first electrode 210 and the second electrode 220.

In this case, a cross-section perpendicular to the x-axis of the fixed electrode part 200 includes a rectangular shape. That is, the cross section includes a square shape. The flow path through which the fluid flows may be formed in the x-axis direction from the inlet 330 to the outlet 340 inside the fixed electrode part 200 having a rectangular shape.

Figure 3:
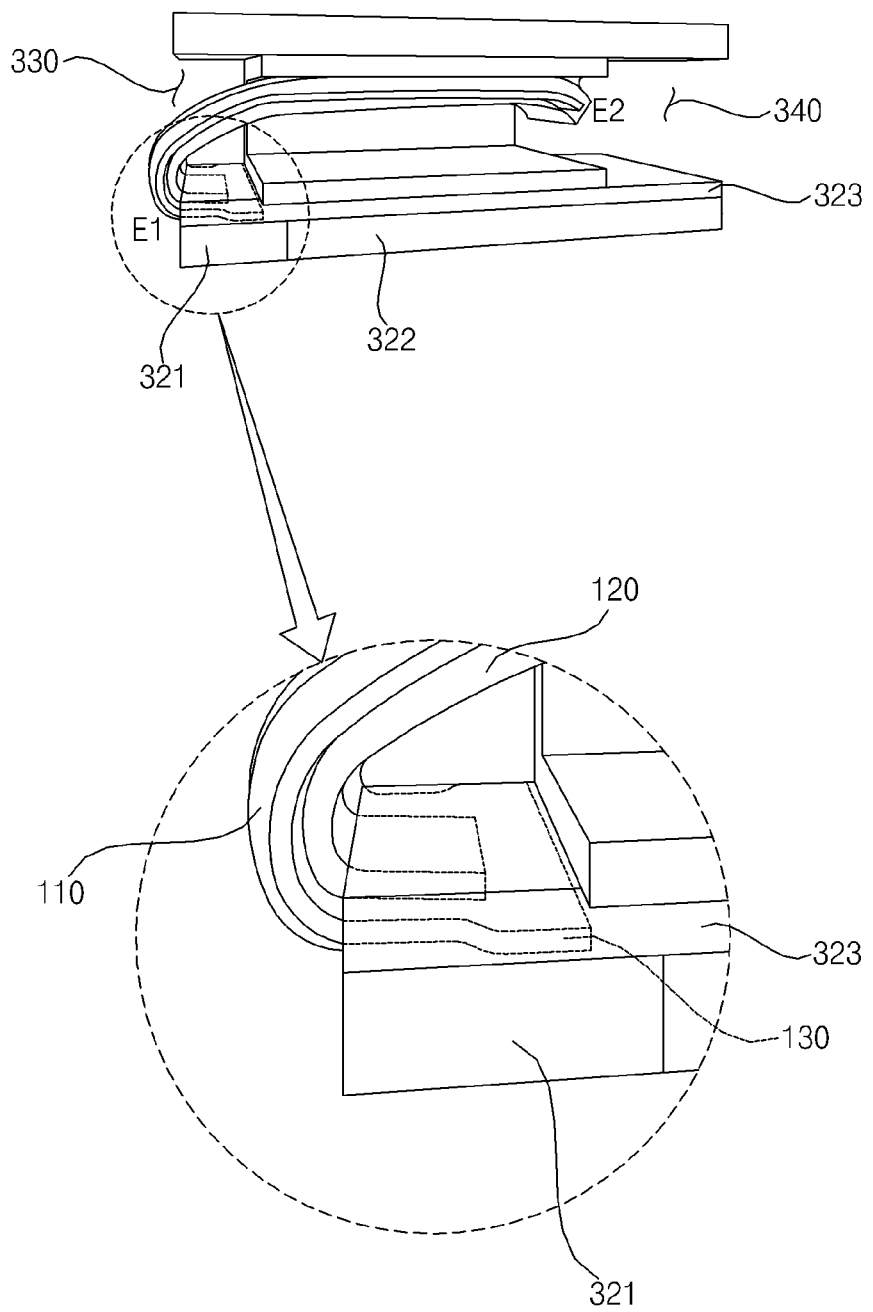
FIG. 3 is a diagram illustrating a connection structure of a housing and a flexible electrode part in a triboelectric generator according to an embodiment of the present disclosure.

FIG. 3 is a diagram illustrating a connection structure of the housing 300 and the flexible electrode part 100 in the triboelectric generator 10 according to an embodiment of the present disclosure.

Referring to FIG. 3, the lower end surface 320 of the housing 300 may include a third electrode 321, a support plate 322, and an insulating plate 323.

The third electrode 321 may be formed in the lower end of the inlet 330 side of the housing 300. The third electrode 321 may be made of a conductive material through which a current can flow, like the first electrode 210 and the second electrode 220.

For example, the third electrode 321 may include at least one of aluminum Al, copper Cu, graphene, carbon nanotube CNT, or a conductive composite.

The support plate 322 may be formed on a side surface of the third electrode 321, or may include a shape including the third electrode 321 therein. The support plate 322 forms a part of the outer surface of the housing 300.

The support plate 323 may be made of a non-conductive material, and may be made of a material having high hardness to support the flexible electrode part 100 and the fixed electrode part 200 inside the housing 300.

The insulating plate 323 may be formed in a stacked form on the upper portion of the third electrode 321 and the support plate 322, and the second electrode 220 may be located thereon.

The insulating plate 323 is to insulate the second electrode 220 from the metal layer 130 and the third electrode 321, and is made of an insulating material. The insulating plate 323 may be made of the same material as the support plate 322.

The flexible electrode part 100 may include one end E1 connected to the third electrode 321, and the other end E2 located between the first electrode 210 and the second electrode 220.

Specifically, one end E1 of the flexible electrode part 100 is connected to and fixed to the insulating plate 323, and the metal layer 130 may extend to the outside of the first dielectric layer 110 and the second dielectric layer 120 from one end E1 of the flexible electrode part 100, and may be electrically connected to the third electrode 321.

Since the metal layer 130 extending to the outside is located inside the insulating plate 323 formed on the third electrode 321, it is insulated from the second electrode 220.

The other end E2 of the flexible electrode part 100 is not fixed between the first electrode 210 and the second electrode 220, but is located to be freely movable. The flexible electrode part 100 may be curved into an inner space of the housing 300 from one end E1 to the other end E2.

Meanwhile, the inlet 330 may include a structure having a portion which is blocked by the flexible electrode part 100 having a curved shape. Specifically, it may be a structure where the lower end surface of the inlet 300 is blocked by the flexible electrode part 100 in the vicinity of an area where one end E1 of the flexible electrode part 100 is connected to the insulating layer 323.

Referring to FIGS. 2A and 2B, the width of the flexible electrode part 100 may be the same as the width W of the flow path formed by the first electrode 210 and the second electrode 220. Accordingly, since the lower end surface of the inlet 330 is blocked by the flexible electrode part 100, the flow path of the fluid may be formed only through the upper surface Art of the inlet 330.

Meanwhile, the width of the flexible electrode part 100 may be smaller than the width W of the flow path formed by the first electrode 210 and the second electrode 220. In this case, since only a portion of the lower end surface of the inlet 330 is blocked by the flexible electrode part 100, the fluid may flow through both sides of the lower end surface of the inlet 300.

Figure 4:
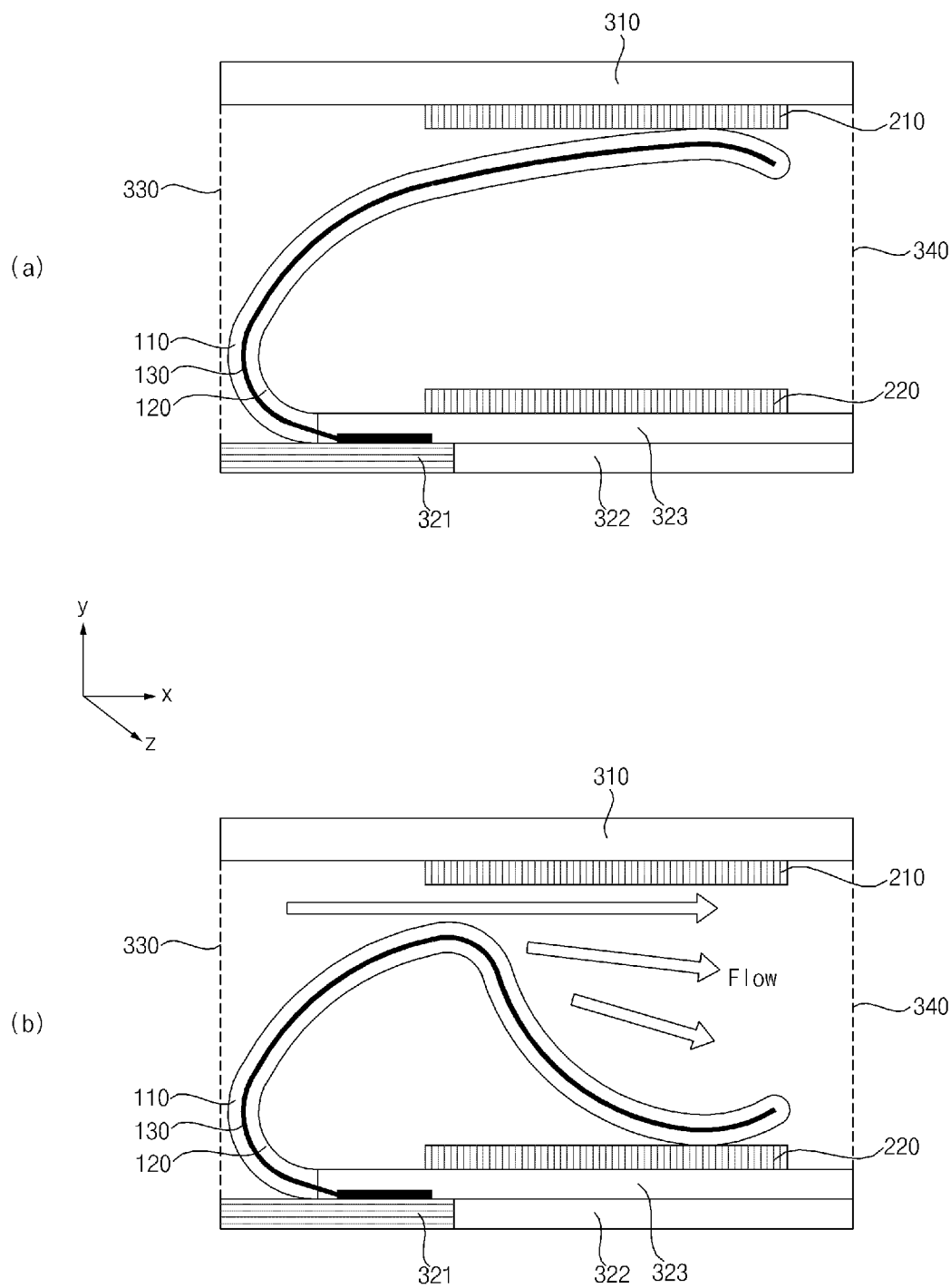
FIG. 4 is a diagram for explaining the movement of a flexible electrode part in a triboelectric generator according to an embodiment of the present disclosure.

FIG. 4 is a diagram for explaining the movement of the flexible electrode part 10 in the triboelectric generator 10 according to an embodiment of the present disclosure.

Referring to FIG. 4A, in a state in which the fluid does not flow into the housing 300, one side of the first dielectric layer 110 may be in contact with the first electrode 210 based on elasticity of the flexible electrode part 100.

Meanwhile, when the fluid flows into the housing 300 through the inlet 330 (see FIG. 4B), the flexible electrode part 100 may flow while being spaced apart from the first electrode 210 based on the flow of the fluid, and may be in contact with the second electrode 220. In this case, the flow path of the fluid may be formed in the direction of the outlet 340 from the upper end surface of the inlet 330.

As described above, when the flow path of the fluid is formed on the upper end surface of the flexible electrode part 100, a difference between the pressure of the upper end and the pressure of the lower end of the flexible electrode part 100 increases. Therefore, the width of the movement of the flexible electrode part 100 may be larger, and the frequency of movement may be higher, in comparison with a case where the flow path is formed in both the upper end surface and the lower end surface of the flexible electrode part 100.

Accordingly, the efficiency of power generation can be further enhanced.

When the fluid continues to flow through the inlet 330, the fluid flows inside the housing 300, and the flexible electrode part 100 may move while repeating contact and non-contact processes with at least one of the first electrode 210 or the second electrode 220 based on the flow of the fluid.

When the flexible electrode part 100 comes into contact with at least one of the first electrode 210 or the second electrode 220, triboelectrification may occur.

While the fluid flows into the housing 300, the dielectric electrode part 100 continuously repeats contact and non-contact processes with the first electrode 210 and the second electrode 220 disposed in both sides. Therefore, the friction frequency becomes higher in comparison with a structure in which electrode is disposed only in one side of the dielectric electrode part 100. Accordingly, the density of power generated in the triboelectric generator based on triboelectrification can be increased.

Meanwhile, in a state in which the fluid does not flow into the housing 300, the other end E2 of the first dielectric layer 110 may be in a non-contact state with the first electrode 210. For example, the other end E2 of the first dielectric layer 110 may be spaced apart from the first electrode 210 by a certain distance so as to have a slight gap from the first electrode 210. To this end, a spaced distance between the first electrode 210 and the second electrode 220 or a degree of bending of the flexible electrode part 100 inside the housing 300 may be adjusted.

Figure 5:
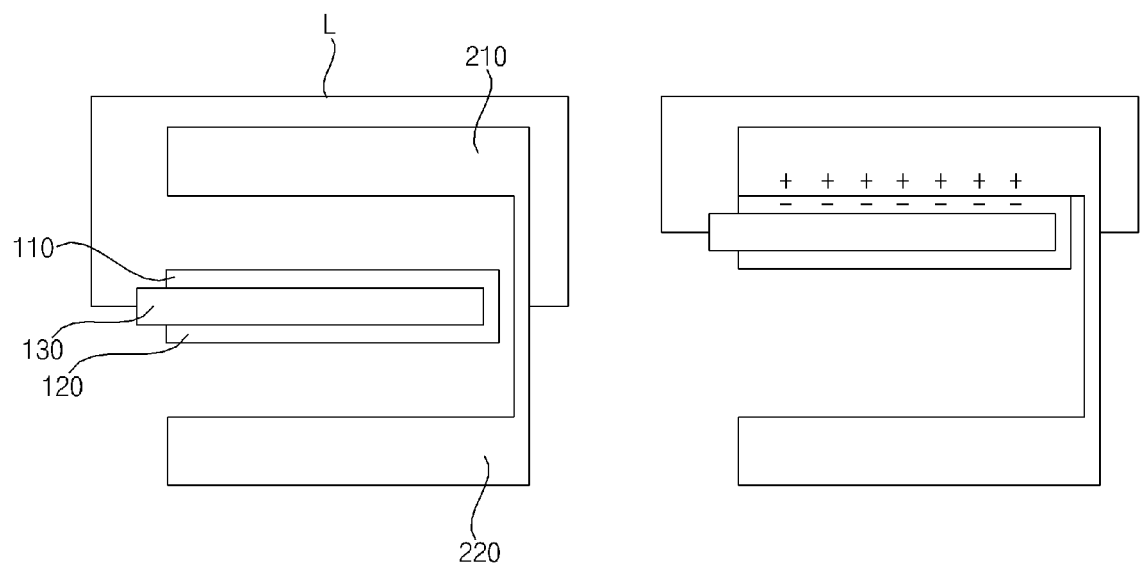
FIGS. 5 to 6 are diagrams for explaining a triboelectrification generation process of a triboelectric generator according to an embodiment of the present disclosure.
Figure 5:
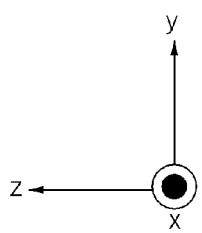
Figure 5:
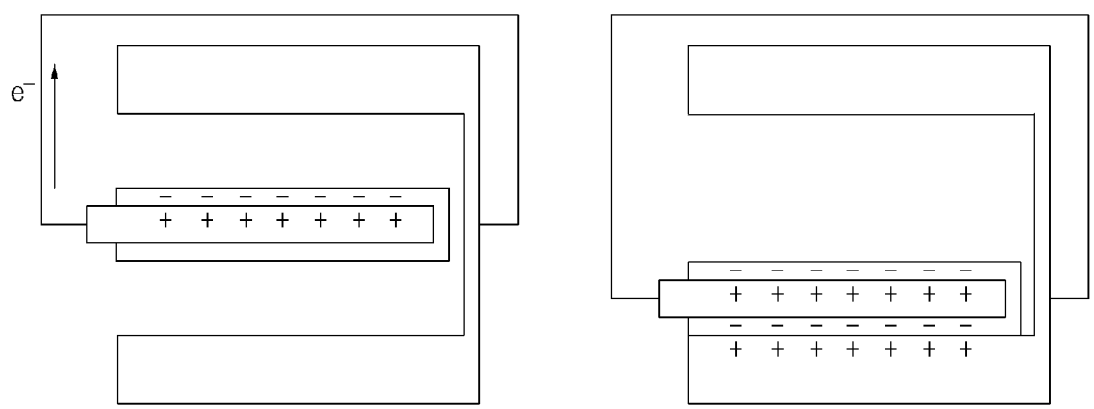
Figure 6:
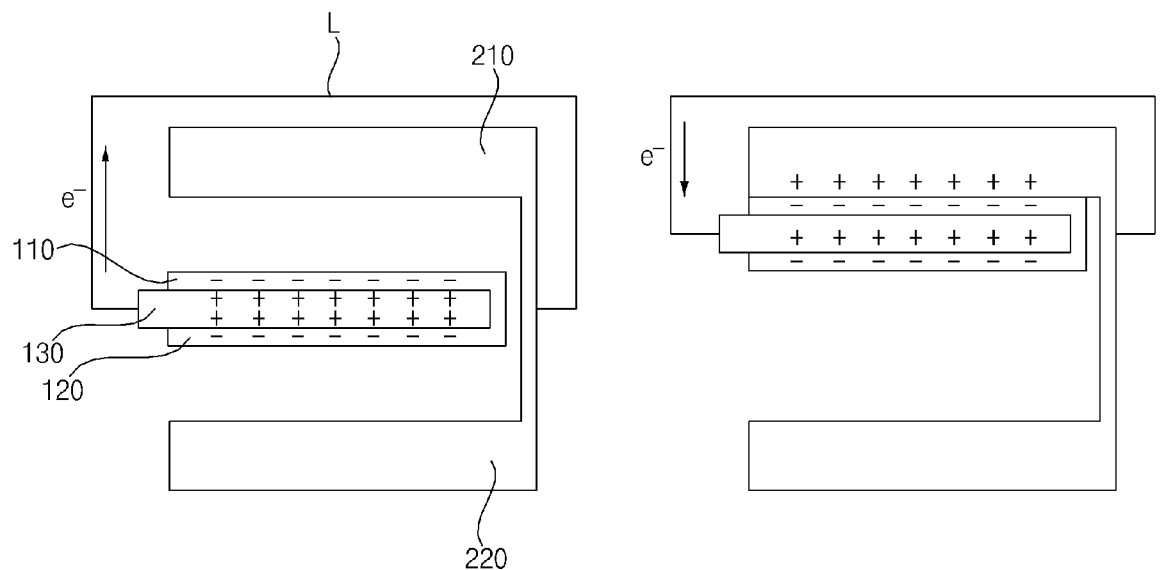
Figure 6:
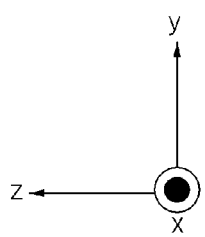
Figure 6:
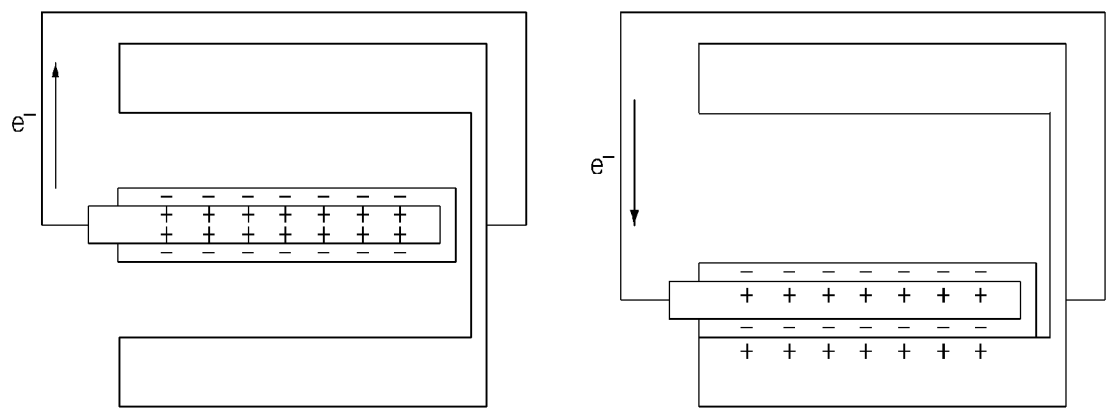

FIGS. 5 to 6 are diagrams for explaining a triboelectrification generation process of the triboelectric generator 10 according to an embodiment of the present disclosure.

In the drawing, an electrode in the form of an open one side in a rectangle represents the first electrode 210 and the second electrode 220, and a straight electrode in the middle portion represents the flexible electrode part 100. Although the flexible electrode part 100 is in contact with or not in contact with the first electrode 210 and the second electrode 220 in a bent state, it will be described as having a straight shape for convenience.

Referring to FIG. 5, in a state in which the fluid does not flow into the housing 300, the flexible electrode part 100 may be in a contact state (FIG. 5B) with the first electrode 210, and may be in a non-contact state (FIG. 5A).

Referring to FIG. 5B, when the fluid flows into the housing 300 through the inlet 330, the flexible electrode part 100 moves up and down by the flow of the fluid. By the movement of the flexible electrode part 100, the first dielectric layer 110 is in contact with the first electrode 210.

Based on a difference in electronegativity between the first dielectric layer 110 and the first electrode 210, electrons are emitted from the first electrode 210, and the emitted electrons move to the first dielectric layer 110. Accordingly, the surface of the first dielectric layer 110 has a negative (−) polarity, and the surface of the first electrode 210 has a positive (+) polarity.

Referring to FIG. 5C, thereafter, the first dielectric layer 110 is separated from the first electrode 210 by the movement of the flexible electrode part 100. Accordingly, electrons move from the metal layer 130 to the first electrode 210. Current flows in a conductive wire L connected between the metal layer 130 and the first electrode 210 by the movement of electrons.

Accordingly, the surface of the metal layer 130 in contact with the first dielectric layer 110 has a positive (+) polarity, and the polarity of the surface of the first electrode 210 disappears. The surface of the first dielectric layer 110 continues to have a negative (−) polarity.

Referring to FIG. 5D, thereafter, the second dielectric layer 120 comes into contact with the second electrode 220 by the movement of the flexible electrode part 100.

Based on a difference in electronegativity between the second dielectric layer 120 and the second electrode 220, electrons are emitted from the second electrode 220, and the emitted electrons move to the second dielectric layer 120. Accordingly, the surface of the second dielectric layer 120 has a negative (−) polarity, and the surface of the second electrode 220 has a positive (+) polarity.

Referring to FIG. 6A, thereafter, the second dielectric layer 120 is separated from the second electrode 220 by the movement of the flexible electrode part 100. Accordingly, electrons move from the metal layer 130 to the second electrode 220. Current flows in the conductive wire L connected between the metal layer 130 and the first electrode 210 based on the movement of electrons.

Accordingly, the surface of the metal layer 130 in contact with the second dielectric layer 120 has a positive (+) polarity, and the polarity of the surface of the second electrode 220 disappears. The surface of the second dielectric layer 120 continues to have a negative (−) polarity.

Referring to FIG. 6B, thereafter, the first dielectric layer 110 comes into contact with the first electrode 210 by the movement of the flexible electrode part 100. Since the first dielectric layer 110 has a negative polarity, electrons are emitted from the first electrode 210 and move to the metal layer 130 through the conductive wire L. Accordingly, the surface of the second electrode 220 has a positive (+) polarity, and the surface of the metal layer 130 in contact with the first dielectric 110 loses the polarity.

Thereafter, according to the continuous movement of the flexible electrode part 100, current flows through the conductor L, while the first dielectric layer 110 and the second dielectric layer 120 is repeatedly in contact or non-contact with the first electrode 210 and the second electrode 220. Referring to FIG. 6, current flows through the conductor L while repeatedly circulating the processes of A, B, C, and D.

Figure 7:
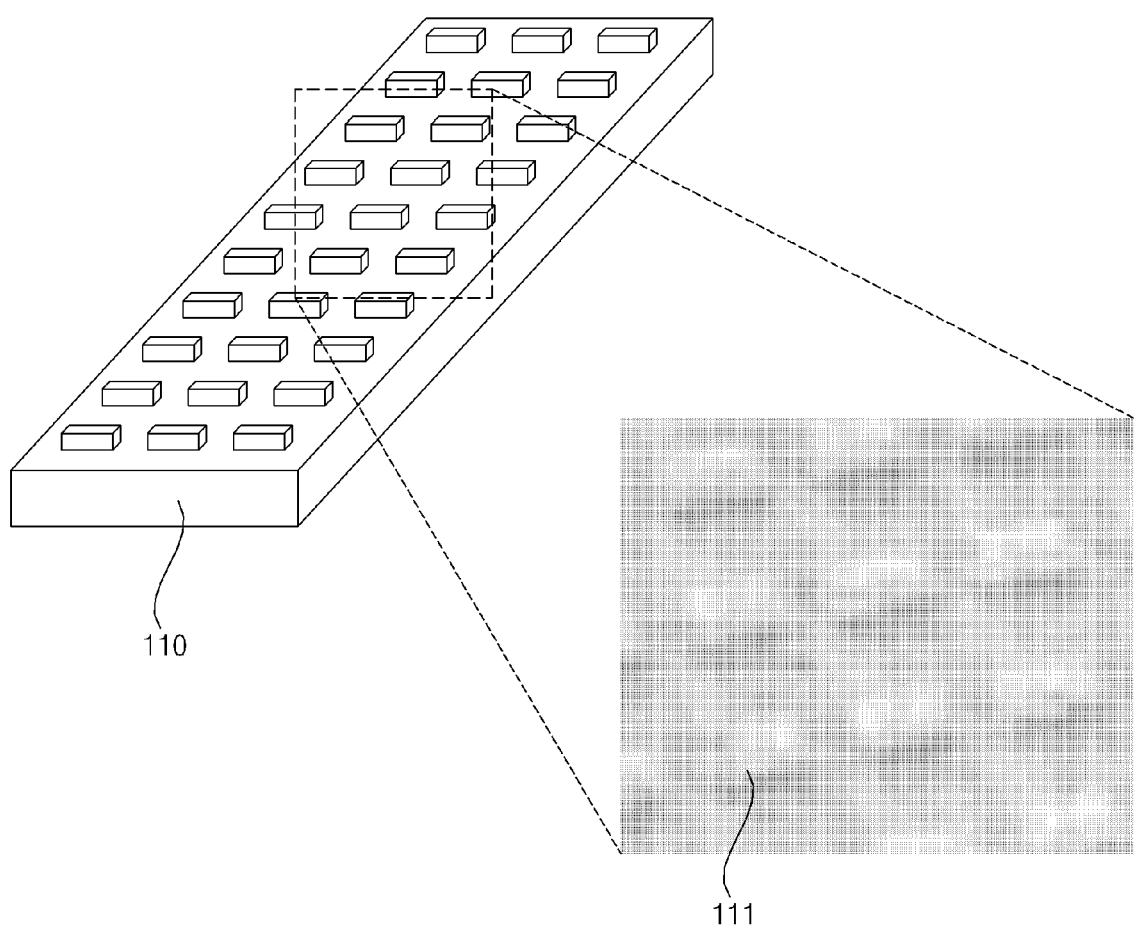
FIG. 7 is a diagram illustrating a surface structure of a dielectric layer in a triboelectric generator according to an embodiment of the present disclosure.

FIG. 7 is a diagram illustrating a surface structure of a dielectric layer 110, 120 in the triboelectric generator 10 according to an embodiment of the present disclosure.

Referring to FIG. 7, at least one of the first dielectric layer 110 or the second dielectric layer 120 may include a friction pattern 111 formed on a surface in contact with the first electrode 210 or the second electrode 220.

The friction pattern 111 may be formed in the form of a grid having a certain size. The friction pattern 111 may increase surface roughness of the first dielectric layer 110 and the second dielectric layer 120. Although shown in the form of a square pillar in the drawing, the friction pattern 111 may be formed in various shapes such as a hemispherical shape and a polygonal pole.

Meanwhile, surfaces of the first dielectric layer 110 and the second dielectric layer 120 may be reactive-ion-etched (RIE) by plasma. The friction pattern 111 may be formed on the surface of the first and second dielectric layers 110 and 120 by etching.

Accordingly, the density of power generated in the triboelectric generator 10 may be increased by the friction pattern 111.

Meanwhile, the friction pattern 111 may be formed on the surface of the first dielectric layer 110 and the second dielectric layer 120 through an imprinting or photolithography method.

Meanwhile, the first dielectric layer 110 or the second dielectric layer 120 may be composed of a polymer material including at least one of polytetrafluoroethylene (PTFE), polydimethylsiloxane (PDMS), fluorinated ethylene propylene (FEP), polyethylene terephthalate (PET), Ecoflex, or Silicone rubber.

Figure 8:
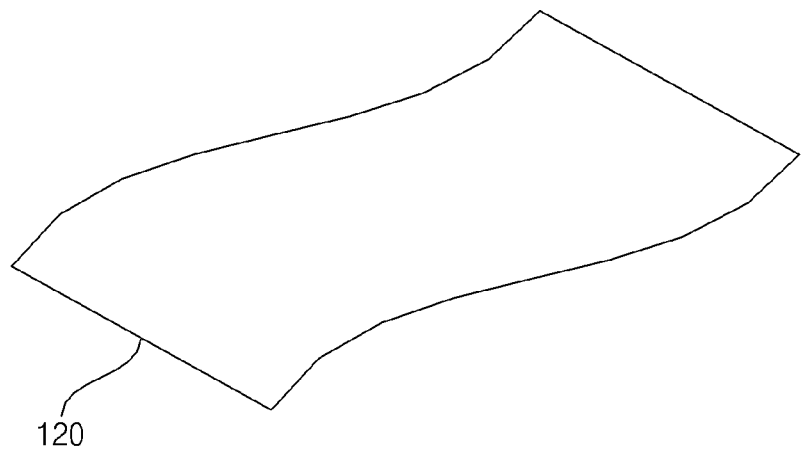
FIG. 8 is a diagram showing various examples of a metal layer included in a flexible electrode part of a triboelectric generator of the present disclosure.
Figure 8:
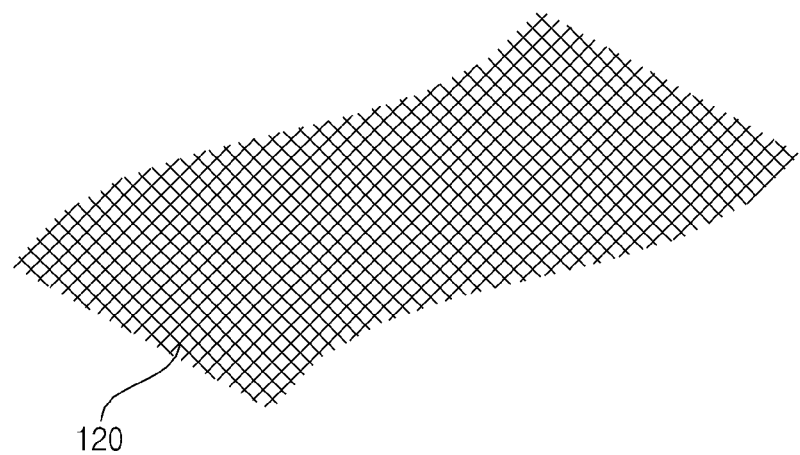

FIG. 8 is a diagram showing various examples of the metal layer 100 included in the flexible electrode part 100 of the triboelectric generator 10 of the present disclosure.

Referring to FIG. 8, the metal layer 130 may include a thin film shape (FIG. 8A). Alternatively, the metal layer 130 may include a shape in which a plurality of wires are connected in a mesh form (FIG. 8B).

The metal layer 130 may be formed in a wide and thin shape between the first dielectric layer 110 and the second dielectric layer 120. The metal layer 130 may be made of a metal including at least one of aluminum Al, copper Cu, graphene, Carbon NanoTube (CNT), or a conductive composite, but is not limited thereto.

Meanwhile, the first dielectric layer 110 and the second dielectric layer 120 are made of a material having an electronegativity different from that of the first electrode 210 and the second electrode 220. Specifically, the first dielectric layer 110 and the second dielectric layer 120 may be made of a material located in a relatively lower rank in the order of electrification than the first electrode 210 and the second electrode 220.

When the flexible electrode part 100 is in contact with the first electrode 210 or the second electrode 220, based on a difference in electronegativity, electrons move from the first electrode 210 or the second electrode 220 to the first dielectric layer 110 or the second dielectric layer 120. Electrons moved to the first dielectric layer 100 or the second dielectric layer 120 apply a repulsive force to electrons of the metal layer 130 to move electrons of the metal layer 130. Since the metal layer 130 is formed in a wide and thin shape between the first dielectric layer 110 and the second dielectric layer 120, electrons generated by triboelectrification can easily move to the metal layer 130.

The metal layer 130 may be inserted into between the first dielectric layer 110 and the second dielectric layer 120 in the length direction of the flexible electrode part 100, thereby increasing the reaction efficiency and speed between the electrons moved to the first dielectric layer 110 and the second dielectric layer 120 and the metal layer 130, and enhancing the amount of moving charges generated by triboelectrification.

In addition, the overall efficiency and performance of the triboelectric generator 10 can be enhanced by increasing the reaction efficiency and speed between the electrons moved to the first dielectric layer 110 and the second dielectric layer 120 and the metal layer 130.

Meanwhile, the flexible electrode part 100 including the metal layer 130, the first dielectric layer 110, and the second dielectric layer 120 may include a thickness in the range of 0.1 mm to 1.0 mm. However, it is not necessarily limited to this range.

Meanwhile, the width by which the first electrode 210 and the second electrode 220 of the triboelectric generator 10 are spaced apart may be 5 mm, or may be in the range of 1.0 mm to 10 mm. However, it is not necessarily limited to this range.

Figure 9:
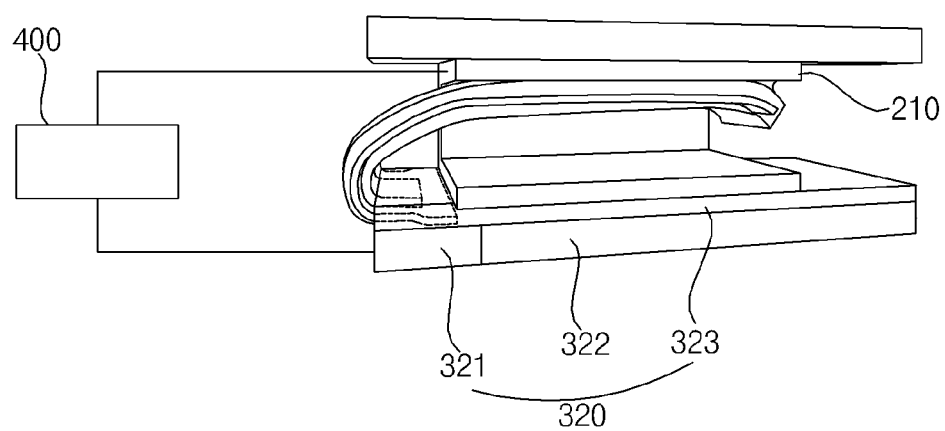
FIG. 9 is a diagram illustrating an example in which an energy storage part is included in a triboelectric generator of the present disclosure.

FIG. 9 is a diagram illustrating an example in which an energy storage part 400 is included in the triboelectric generator 10 of the present disclosure.

Referring to the drawing, the triboelectric generator 10 may further include the energy storage part 400.

One terminal of the energy storage part 400 may be connected to the third electrode 321 of the housing 300, and the other terminal may be connected to the first electrode 210 or the second electrode 220. One end of the energy storage part 400 may be connected to the metal layer 130 through the third electrode 321.

The energy storage part 400 may store electrical energy based on a current which is generated by triboelectrification and flows between the flexible electrode part 100 and the fixed electrode part 200. The energy storage part 400 may be a device that stores general electrical energy, such as a capacitor or a battery.

Both terminals of the energy storage part 400 may be connected to various external electronic devices such as a wireless sensor and a mobility battery, and may supply power to a connected electronic device.

Figure 10:
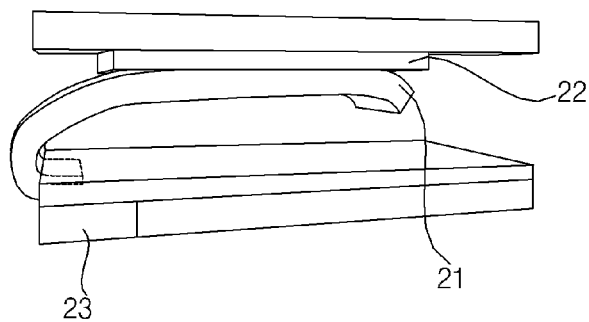
FIG. 10 is a diagram illustrating a triboelectric generator and devices for comparison according to various embodiments of the present disclosure.
Figure 10:
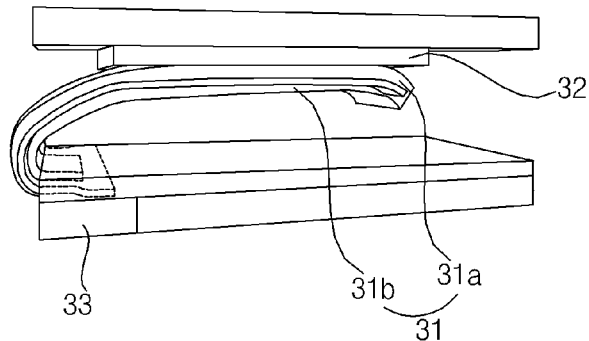
Figure 10:
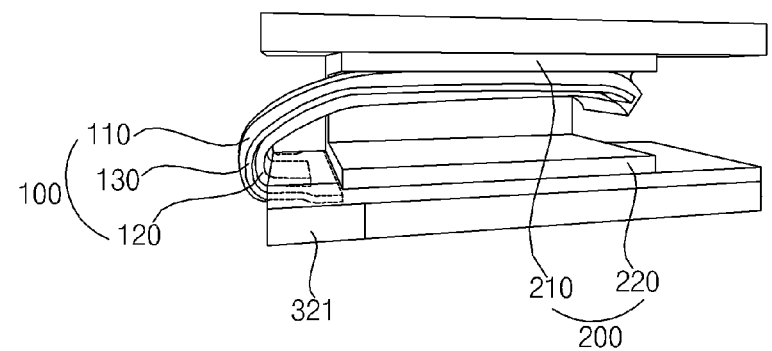
Figure 11A:
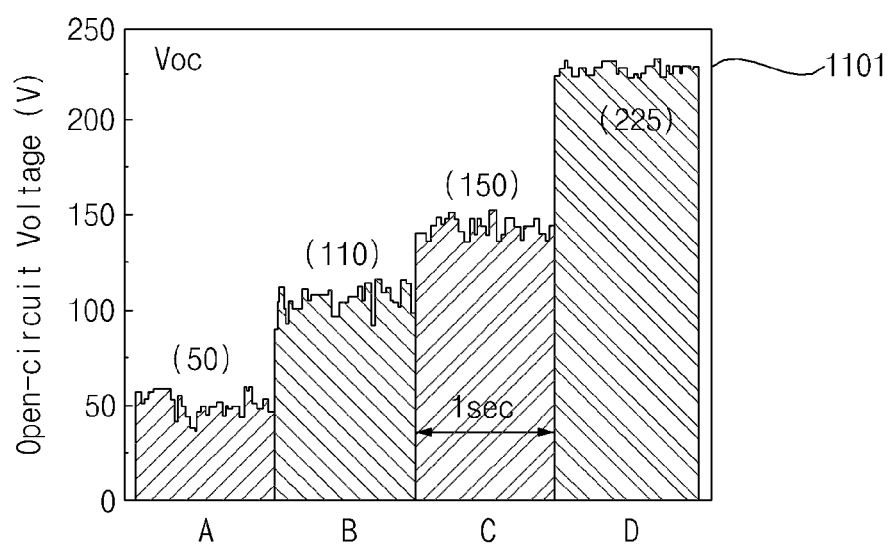
Figure 11B:
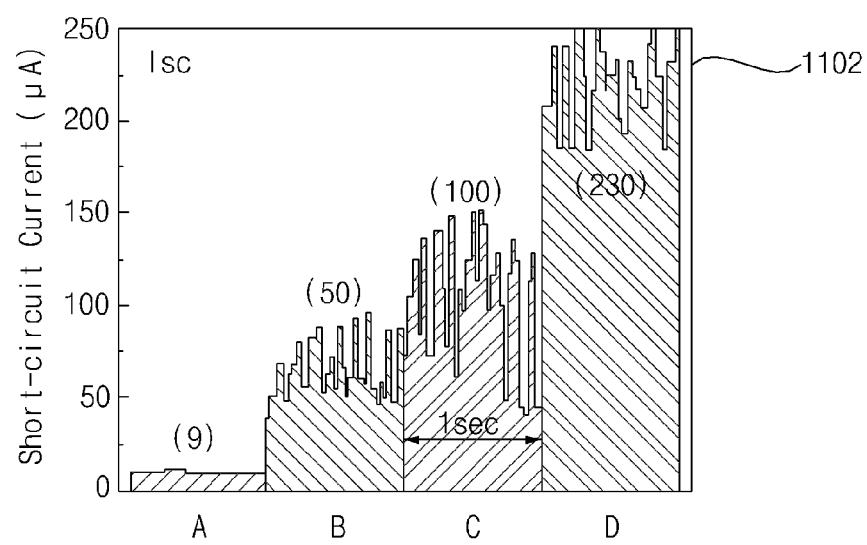
Figure 11C:
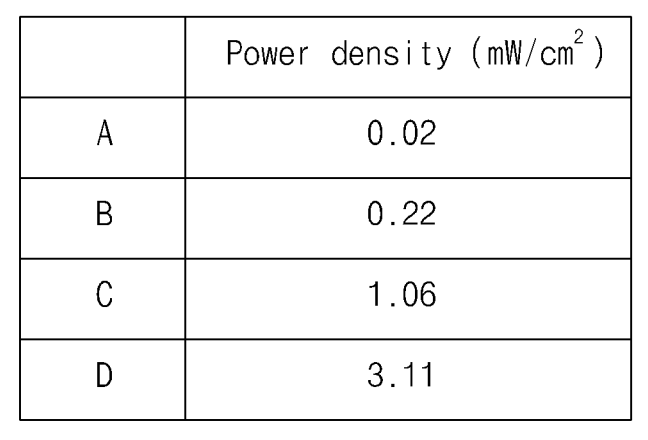

FIG. 10 is a diagram illustrating the triboelectric generator 10 and devices for comparison according to various embodiments of the present disclosure, and FIGS. 11A to 11C are a graph and a table showing voltage, current, and power density of the triboelectric generator 10 according to various embodiments of the present disclosure compared to other devices.

Referring to FIG. 10C, the triboelectric generator 10 according to an embodiment of the present disclosure includes two dielectric layers 110 and 120 and one metal layer 130 in the flexible electrode part 100, and the first electrode 210 and the second electrode 220 may be respectively located in upper and lower ends of the flexible electrode part 100. The third electrode 321 connected to the metal layer 130 of the flexible electrode part 100 may be included. The triboelectric generator 10 according to an embodiment of the present disclosure is hereinafter referred to as a device C.

Meanwhile, in the triboelectric generator 10 according to another embodiment of the present disclosure, a friction pattern may be formed on each of the surfaces of the two dielectric layers 110 and 120. The triboelectric generator 10 according to another embodiment of the present disclosure is hereinafter referred to a device D.

Referring to FIG. 10A, as an example for comparison, a first triboelectric generator 20 may include a flexible insulating part 21 formed of a single dielectric layer, a first fixed electrode 22 located in the upper end of the flexible insulating part 21, and a second fixed electrode 23 connected to the flexible insulating part 21. The first triboelectric generator 20 is hereinafter referred to as a device A.

Referring to FIG. 10B, as another example for comparison, a second triboelectric generator 30 may include a flexible electrode part 31 including a single dielectric layer 31a and a metal layer 31b therein, a first fixed electrode 32, and a second fixed electrode 33 connected to the metal layer 31b of the flexible electrode part 31. The second triboelectric generator 30 is hereinafter referred to as a device B.

Devices A, B, C, and D have the same size of a flow path, a dielectric layer, a metal layer, and a fixed electrode, and the dielectric layer may be formed of a PTFE material.

FIG. 11A is a graph 1101 showing a value obtained by measuring the voltage of each device for a certain time (1 sec) when triboelectrification occurs based on the flow of fluid. Referring to the graph 1101, the voltage of device A is about 50V, the voltage of device B is about 110V, the voltage of device C according to an embodiment of the present disclosure is about 150V, and the voltage of device D according to another embodiment of the present disclosure is about 225V.

FIG. 11B is a graph 1102 showing a value obtained by measuring the current of each device for a certain time (1 sec) when triboelectrification occurs based on the flow of fluid. Referring to the graph 1102, the current of device A is about 9 µA, the current of device B is about 50 µA, the voltage of device C is about 100 µA, and the voltage on device D is about 230 µA.

FIG. 11C shows the measured value of power density generated in each device when triboelectrification occurs based on the flow of fluid. Referring to FIG. 11C, the power density generated in the device A is about 0.02 mW/cm2, the power density generated in the device B is about 0.22 mW/cm2, the power density generated in the device C is about 1.06 mW/cm2, and the power density generated in the device D is about 3.11 mW/cm2.

Comparing device A and device B, it can be seen that the generated power density increases by about 11 times when the metal layer is included in the flexible insulating part. Comparing device B and device C, it can be seen that when the fixed electrodes are formed in both sides of the flexible electrode part, the generated power density increases by about 5 times. In addition, comparing device C and device D, it can be seen that when a pattern is formed on the surface of the dielectric layer, the generated power density increases by about 3 times.

As described above, the triboelectric generator 10 according to various embodiments of the present disclosure may include the metal layer 130 included between the dielectric layers 110 and 120 and two electrodes 210 and 220 formed in both sides of the flexible electrode part 100, or further includes a pattern structure formed on the surface of the dielectric layer 110, 120, thereby significantly increasing the generated power density in comparison with a conventional triboelectric power generation device.

The triboelectric power generation device 10 according to the present disclosure is not limited to a configuration of the above described embodiments, but the above embodiments may be configured by selectively combining all or part of each of embodiments so that various modifications can be achieved.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A triboelectric generator comprising:
   a flexible electrode part comprising a first dielectric layer, a second dielectric layer, and at least one metal layer disposed between the first dielectric layer and the second dielectric layer; and
   a fixed electrode part spaced apart from both sides of the flexible electrode part, and comprising a first electrode and a second electrode connected to each other,
   wherein the flexible electrode part generates triboelectrification based on contact and non-contact with at least one of the first electrode or the second electrode by a fluid flow, and
   an electric charge generated by the triboelectrification moves through the metal layer.

2. The triboelectric generator of claim 1, wherein the first electrode and the second electrode are formed as one body, wherein a cross-section of the fixed electrode part includes a rectangular shape having an open one side.

3. The triboelectric generator of claim 1, wherein the first electrode and the second electrode are formed as one body, wherein a cross-section of the fixed electrode part includes a rectangular shape.

4. The triboelectric generator of claim 1, further comprising a housing for supporting the flexible electrode part and the fixed electrode part,
wherein the housing comprises an inlet into which the fluid flows and an outlet through which the fluid is discharged, and
wherein a flow path of the fluid is formed from the inlet to the outlet.

5. The triboelectric generator of claim 4, wherein the flexible electrode part includes a shape curved in an inner side of the housing for one end being connected to a lower end surface of the inlet side of the housing, and for the other end being located between the first electrode and the second electrode.

6. The triboelectric generator of claim 5, wherein the inlet includes a portion blocked by the flexible electrode part of the curved shape.

7. The triboelectric generator of claim 5, wherein the first dielectric layer includes one side which is in a contact or non-contact state with the first electrode based on a elasticity of the flexible electrode part,
wherein, in response to fluid flowing into the inlet, the flexible electrode part flows based on the flow of fluid, and generates triboelectrification based on contacting and non-contacting with at least one of the first electrode or the second electrode.

8. The triboelectric generator of claim 5, wherein the housing further comprises a third electrode formed in the lower end surface, and
wherein the metal layer is connected to the third electrode.

9. The triboelectric generator of claim 1, wherein at least one of the first dielectric layer or the second dielectric layer includes a friction pattern formed on a surface which is in contact with the first electrode or the second electrode.

10. The triboelectric generator of claim 1, wherein the first dielectric layer and the second dielectric layer are made of a material having a different electronegativity from the first electrode and the second electrode.

11. The triboelectric generator of claim 1, wherein the metal layer includes a thin film shape.

12. The triboelectric generator of claim 1, wherein the metal layer includes a shape in which a plurality of wires are connected in a form of mesh.

13. The triboelectric generator of claim 1, further comprising an energy storage part electrically connected to the metal layer and the first electrode or the second electrode,
wherein the energy storage part stores an electrical energy of a current which is generated by the triboelectrification and flows between the flexible electrode part and the fixed electrode part.

14. The triboelectric generator of claim 1, wherein the metal layer comprises at least one of aluminum Al, copper Cu, graphene, Carbon NanoTube (CNT), or a conductive composite.

15. The triboelectric generator of claim 1, wherein the first electrode and the second electrode comprise at least one of aluminum Al, copper Cu, graphene, Carbon NanoTube (CNT), or a conductive composite.

16. The triboelectric generator of claim 1, wherein the first dielectric layer or the second dielectric layer is formed of a material containing at least one of polytetrafluoroethylene PTFE, polydimethylsiloxane PDMS, fluorinated ethylene propylene FEP, polyethylene terephthalate PET, Ecoflex or Silicone rubber.

* * * * *